United States Patent
Chase (10) Patent No.: US 10,280,643 B2
(45) Date of Patent: May 7, 2019

(54) TOWER SEGMENT AND METHOD UTILIZING SEGMENTED BEARING PLATE

(71) Applicants: Siemens Gamesa Renewable Energy, Inc., Orlando, FL (US); Wind Tower Technologies, LLC, Boulder, CO (US)

(72) Inventor: Matthew J. Chase, Windsor, CO (US)

(73) Assignees: WIND TOWER TECHNOLOGIES, LLC, Boulder, CO (US); SIEMENS GAMESA RENEWABLE ENERGY, INC., Orlando, FL (US)

( * ) Notice: Subject to any disclaimer, the term of this patent is extended or adjusted under 35 U.S.C. 154(b) by 0 days.

(21) Appl. No.: 15/750,532

(22) PCT Filed: Aug. 16, 2016

(86) PCT No.: PCT/US2016/047118
§ 371 (c)(1),
(2) Date: Feb. 6, 2018

(87) PCT Pub. No.: WO2017/040019
PCT Pub. Date: Mar. 9, 2017

(65) Prior Publication Data
US 2018/0238070 A1 Aug. 23, 2018

Related U.S. Application Data

(60) Provisional application No. 62/211,972, filed on Aug. 31, 2015.

(51) Int. Cl.
*E04H 12/12* (2006.01)
*E04H 12/16* (2006.01)
(Continued)

(52) U.S. Cl.
CPC ............. *E04H 12/12* (2013.01); *E04H 12/16* (2013.01); *F03D 13/20* (2016.05); *E04H 12/342* (2013.01);
(Continued)

(58) Field of Classification Search
CPC ....... E04H 12/12; E04H 12/16; E04H 12/342; F03D 13/20; F03D 13/10; Y02E 10/728; F05B 2240/912
(Continued)

(56) References Cited

U.S. PATENT DOCUMENTS 5,586,417 A * 12/1996 Henderson ............. E02D 27/42
405/233
6,672,023 B2 * 1/2004 Henderson ............. E02D 27/42
405/244

(Continued)

FOREIGN PATENT DOCUMENTS

DE   102012104508 A1   11/2013
EP       2871289 A1    5/2015
JP     2009057713 A    3/2009

OTHER PUBLICATIONS

PCT International Search Report and Written Opinion of International Searching Authority dated Nov. 14, 2016 corresponding to PCT International Application No. PCT/US2016/047118 filed Aug. 16, 2016.

*Primary Examiner* — Joshua K Ihezie (57) ABSTRACT

A concrete wind turbine tower segment is provided with a bearing plate formed by a plurality of individual smaller plates secured within the concrete body of the tower segment. The tower segment may include an anchor bar cage assembly made of an embedded plate with a plurality of anchor bars extending there through and through the plates. A protective sleeve may be positioned over the anchor bars. A method of forming the tower segment includes attaching (Continued)

the plate segments to a precision formed template ring as part of the cage assembly, pouring concrete/grout around the cage assembly against the plates, and removing the template ring to reveal a precision mate face of the bearing plate. The single large, expensive ring may be reused to form multiple tower segments.

8 Claims, 5 Drawing Sheets

(51) Int. Cl.
  *F03D 13/20* (2016.01)
  *E04H 12/34* (2006.01)
  *F03D 13/10* (2016.01)
(52) U.S. Cl.
  CPC ........ *F03D 13/10* (2016.05); *F05B 2240/912* (2013.01); *Y02E 10/728* (2013.01)
(58) Field of Classification Search
  USPC .............. 52/651.01, 651.07, 745.02, 745.03, 52/745.04, 742.14
  See application file for complete search history.

(56) References Cited

U.S. PATENT DOCUMENTS

| | | | | |
|---|---|---|---|---|
| 7,533,505 B2* | 5/2009 | Henderson | ............ | E02D 27/42 405/228 |
| 7,618,217 B2* | 11/2009 | Henderson | ............ | E04H 12/085 405/239 |
| 7,765,766 B2* | 8/2010 | Gomez | ............ | E04H 12/12 52/742.16 |
| 9,175,670 B2* | 11/2015 | Lockwood | ............ | E04H 12/16 |
| 2002/0124502 A1* | 9/2002 | Henderson | ............ | E02D 27/42 52/296 |
| 2004/0131428 A1* | 7/2004 | Henderson | ............ | E02D 27/42 405/233 |
| 2008/0072511 A1* | 3/2008 | Phuly | ............ | E02D 27/42 52/294 |
| 2011/0138704 A1 | 6/2011 | Bagepalli et al. | | |
| 2011/0308186 A1* | 12/2011 | Cortina-Ortega | ....... | F03D 13/20 52/578 |
| 2012/0042585 A1* | 2/2012 | Ericsson | ............ | E04H 12/16 52/173.1 |
| 2012/0137620 A1* | 6/2012 | Gevers | ............ | E02D 27/42 52/651.01 |
| 2012/0291394 A1* | 11/2012 | Tooman | ............ | E02D 27/42 52/699 |
| 2013/0081350 A1* | 4/2013 | Bogl | ............ | E04H 12/08 52/651.01 |
| 2013/0255169 A1* | 10/2013 | Henderson | ............ | E04C 5/125 52/223.13 |
| 2014/0033628 A1* | 2/2014 | Lockwood | ............ | E04H 12/16 52/223.5 |
| 2014/0157715 A1* | 6/2014 | Wagner | ............ | E04H 12/12 52/651.07 |
| 2014/0190115 A1* | 7/2014 | Brenner | ............ | E04H 12/085 52/651.01 |
| 2014/0255106 A1* | 9/2014 | Henderson | ............ | E02D 27/12 405/256 |
| 2016/0017868 A1* | 1/2016 | Lockwood | ............ | E04H 12/16 52/223.5 |
| 2016/0046039 A1* | 2/2016 | Hume | ............ | B28B 7/344 106/638 |
| 2016/0251818 A1* | 9/2016 | Thomsen | ............ | E02D 27/425 52/297 |

* cited by examiner

TOWER SEGMENT AND METHOD UTILIZING SEGMENTED BEARING PLATE

This application claims benefit of the 31 Aug. 2015 filing date of U.S. provisional application No. 62/211,972, which is incorporated by reference herein.

FIELD OF THE INVENTION

This invention relates generally to the field of equipment towers, and more particularly, to a concrete wind turbine tower with at least one tower segment having a segmented bearing plate surface, and a method of forming a tower segment incorporating a segmented bearing plate.

BACKGROUND OF THE INVENTION

Existing methods of constructing towers used to support different types of equipment, such as lighting, antennae, cellular telephone equipment or wind turbine equipment, vary depending on whether the tower materials are steel or concrete. The decision process used to select whether the tower is to be built out of steel or concrete may depend upon the geographic location, regional resources, height and weight bearing requirements for the tower, and access to the site for constructing the tower. Steel towers are commonly built by bolting steel tubular sections together at intermediate flanges. Generally, as the height of a tower increases, the diameter of the tower's base increases to accommodate higher loads generated by the taller tower. The heights of steel towers are often limited by the diameter of the steel tubular sections that can be physically transported to the construction site without significant modifications to existing roads, bridges, or other right of way constraints. Transporting large diameter steel tubular sections and associated components also increases the cost of tower construction.

Concrete towers have advantages over steel towers because they can be fabricated at or near the tower location when the materials of construction are locally available. Cast-in-place construction methods allow for pouring concrete into forms erected at the tower location. Drawbacks to cast-in-place methods include reduced construction speed and sensitivity to inclement weather. Also, the shape of a typical concrete wind tower is tapered, which creates complexity in the concrete pouring process. Alternatively, concrete tower sections can be fabricated or precast and then stacked at the job site to form the tower. Joints between tower segments may require grout to ensure sufficiently strong connections, and it may be necessary to pump grout to tower heights of up to 300 feet or more, which is time consuming, requires specialized equipment and is weather dependent, thereby adding cost to the tower construction.

U.S. Pat. No. 8,720,139 B2 issued on May 13, 2014, to Henderson describes a post-tensioned concrete foundation for supporting a tower whereby a base flange of the tower is set in grout inside a grout trough molded by a template ring extending around the top surface of the foundation cap. The tower may be plumbed vertically by shim packs positioned in the grout trough below the base flange while grout is poured or pumped into the grout trough under the flange and cured. The template ring may be positioned with respect to a tower anchor bolt cage to form a grout trough during the concrete pour. The template ring may then be removed and reused for the formation of grout troughs of other concrete foundations. A tower or other structure may then be secured in place within the grout trough with an appropriate amount of grout placed therein. This creates a connection where the tower base flange is secured with post-tensioning anchor bars directly within the grout trough of the concrete foundation.

BRIEF DESCRIPTION OF THE DRAWINGS

The invention is explained in the following description in view of the drawings that show.

DETAILED DESCRIPTION OF THE INVENTION

Certain precast concrete tower designs may require the grinding and/or grouting of mating annular concrete surfaces to achieve a quality load bearing connection. Alternatively, a load bearing structure having a flat bearing surface may be fabricated of steel or other appropriate load bearing material, and that structure then attached to the concrete either during the concrete casting process or thereafter. Some towers are hybrid towers using both concrete and steel segments. Such hybrid towers may require a concrete segment to be joined with a steel segment. In such instances, it may be advantageous to incorporate a steel load bearing surface into the concrete section to establish a steel to steel connection to assure a tighter tolerance between segments and a strong and stable connection. For instance, if a steel to steel connection is desired between the uppermost concrete segment of a wind turbine tower and a steel top or tip section to which a nacelle may be attached, a steel ring having a sufficiently large diameter could be cast into the top of the concrete tower segment, in a manner somewhat similar to the process described in the Henderson patent mentioned above. However, such a large diameter steel ring would need to be transported to the casting yard or the tower construction site to be positioned and secured within the uppermost tower segment. If this method were used for a cast-in-place tower, the ring would need to be lifted to height and grout would need to be pumped to height in order to secure the ring within the tower segment. The ring would also need to be machined to a relatively tight tolerance to assure a proper interface for connection with a steel flange of the top or tip section. Machining such a large diameter ring, which could be up to or exceeding 17 feet in diameter, and then transporting the ring to the construction site would add cost to the tower construction.

It has been determined by the present inventor that utilizing a plurality of smaller individual plates to form a larger segmented bearing plate is advantageous over using a single one piece bearing plate for a concrete tower segment. This approach may seem counterintuitive since it is important that the mateface surface of the bearing plate is held to a tight tolerance, and the use of multiple pieces to form this surface would complicate the task of making the surface perfectly flat. The present inventor solves that problem by mounting the individual segmented plates to a flat template during the concrete casting process to establish the required tight tolerance surface, then removing the template from the individual plates once they are attached to the concrete tower segment. In this manner, a single template may be reused multiple times to establish a tight tolerance mating surface on multiple tower segments, and the cost of machining and transporting a single large diameter tight tolerance ring can be amortized over multiple towers, lowering the cost of each individual tower.

Figure 1:
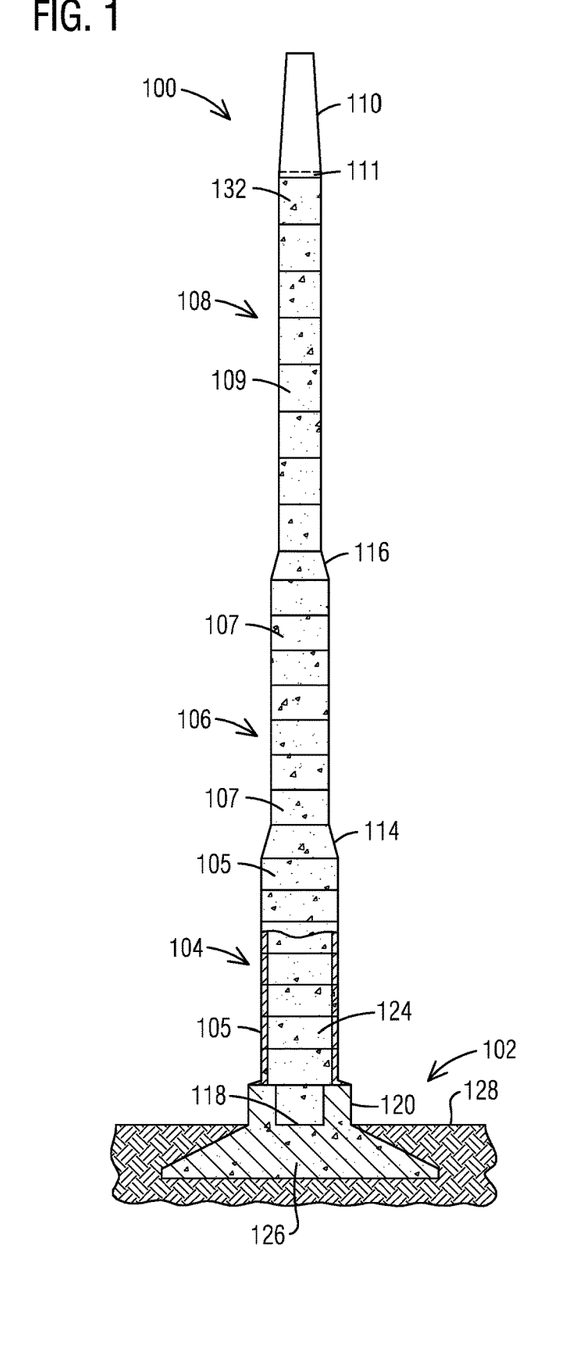
FIG. 1 is an exemplary equipment tower showing a cut-away lower section of the tower.

FIG. 1 illustrates an exemplary equipment tower 100 in accordance with an embodiment of the present invention. The tower 100 is a wind turbine tower, which supports various types of equipment. Such equipment may be affixed at or proximate the top of the equipment tower 100 or other desired locations along the length of the tower 100 depending on a particular application. Tower 100 may include a foundation 102, a bottom tower portion 104, a middle tower portion 106, a top tower portion 108 and a steel tip adapter 110. Each tower portion 104, 106, 108 may be formed with a plurality of tower segments 105, 107, 109, respectively, that may be formed of precast concrete. In an exemplary embodiment of the invention, each tower segment 105 may have a first constant diameter and a first height, each tower segment 107 may have a second constant diameter and a second height and each tower segment 109 may have a third constant diameter and a third height. As illustrated in FIG. 1, the first constant diameter of tower segments 105 may be greater than the second constant diameter of tower segments 107, which in turn may be greater than the third constant diameter of tower segments 109 thereby forming an equipment tower 100 that decreases in diameter from the bottom tower portion 104 to the top tower portion 108. Transition segments 114 and 116 may be positioned between appropriate tower portions 104, 106, 108 to accommodate the progressive step down in the diameter of tower segments 105, 107, 109 from bottom to top of tower 100.

Steel tip adapter 110 may connect to the topmost concrete annular tower segment of the tower 100 using flange 111. Flange 111 may have a plurality of apertures 113 (FIG. 7) used to connect steel tip adapter 110 to the topmost tower segment 132. A nacelle of the wind turbine (not shown) is connected to the top of the steel tip adapter 110 to house the equipment used in the wind turbine, such as the rotor blades, rotor, drivetrain, gearbox, generator, electrical controls, etc. as needed to convert the wind's kinetic energy into electrical energy.

Tower segments 105, 107, 109 may be precast concrete with each having a constant diameter and a constant height. Tower segments 105, 107, 109 may also be match cast together to achieve a precision fit between adjacent sections. Such match cast joints may incorporate a shear key configuration used to transfer shear across the segment joints under transverse loads to the equipment tower 100 and to assist with aligning segments with each other during construction. An exemplary match cast configuration is disclosed in U.S. Pat. No. 9,175,670 issued to Lockwood et al., which is incorporated herein by reference in its entirety. In some instances, epoxy may be applied onto a segment joint prior to closing the gap between two segments. The epoxy may lubricate the annular face of the segments when placing sections on top of one another then seal the joint after the epoxy cures. Further, grout may be used to secure tower segments 105, 107, 109 together depending on site specific parameters.

FIG. 1 further illustrates foundation 102 that may include a platform 118 and a tapered subsection 126. A pedestal or plinth 120 may extend out of platform 118 and have an inside surface that defines an internal chamber 124. The tapered subsection 126 may extend from platform 118 so it is located below ground level 128. In the construction of tower 100, a base of the tapered subsection 126 may be round, square, polygonal or other appropriate shapes depending on site specific parameters. The top portion of subsection 126 may be rounded or formed with a plurality of contiguous flat surfaces as the site specific parameters require. Foundation 102 may be cast-in-place then, after the concrete is cured, subsection 118 may be back filled with dirt to cover its top surface.

Figure 2:
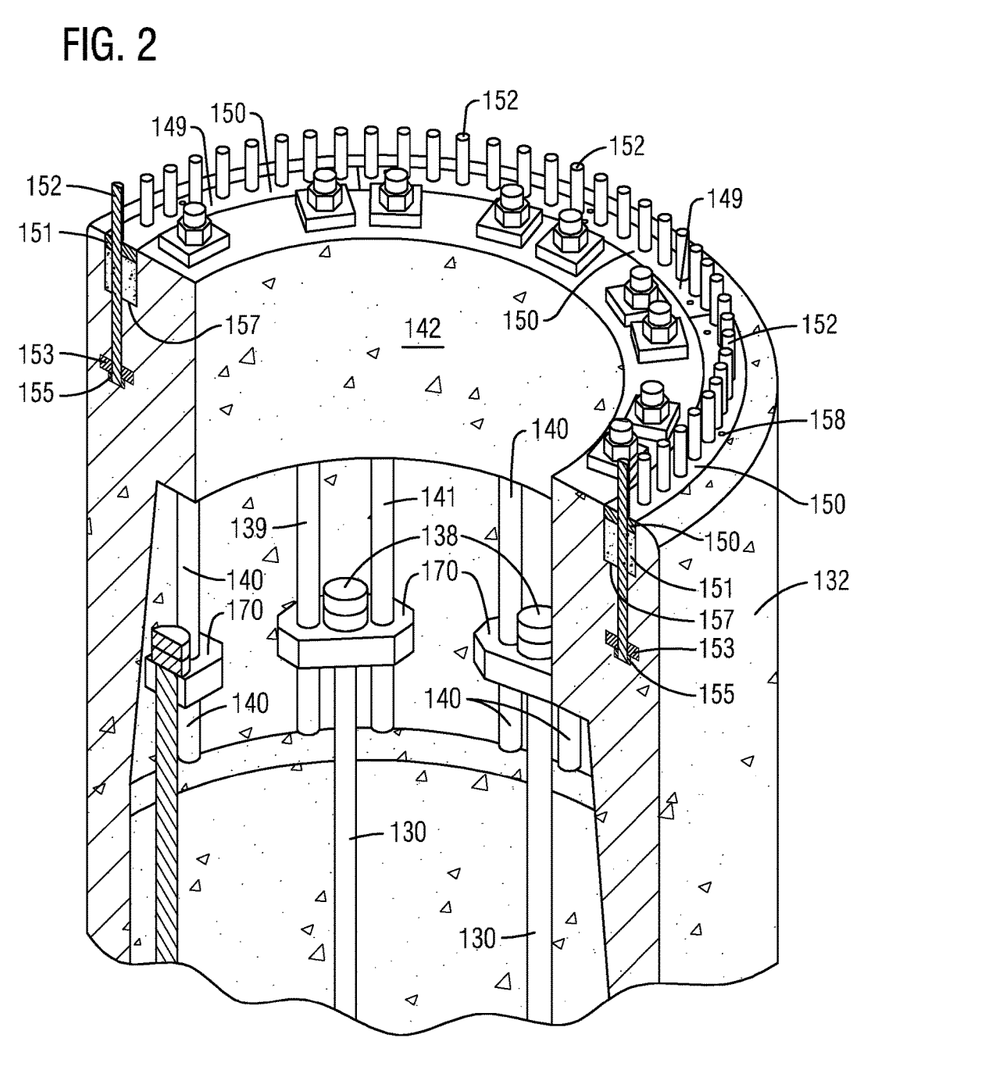
FIG. 2 is a perspective cross sectional view of exemplary segmented plates affixed within an upper segment of the tower of FIG. 1.

FIG. 2 illustrates a perspective, cross sectional view of topmost tower segment 132 having exemplary post-tensioning tendons 130 connected thereto and configured prior to steel tip adapter 110 being attached thereto. An upper end 138 of each tendon 130 is connected by conventional techniques with topmost tower segment 132 by attachment with a respective pair of upper anchor rods 140 that may be embedded within a diaphragm portion 142 of topmost tower segment 132. FIG. 2 further illustrates plate segments 150 affixed within topmost tower segment 132 with a plurality of anchor rods 152 extending through respective plate 150 for receipt of flange 111 of steel tip adapter 110. Anchor rods 152 may extend from an embedded plate 153 with a lower end of anchor rods having a nut 155 threaded thereon. Embedded plate 153 may be made in one piece or it may be formed as a plurality of segment plates. Segmented plate 150 may be affixed within a layer of grout 151 injected within grout trough 157 of the tower segment concrete body 132.

Figure 3:
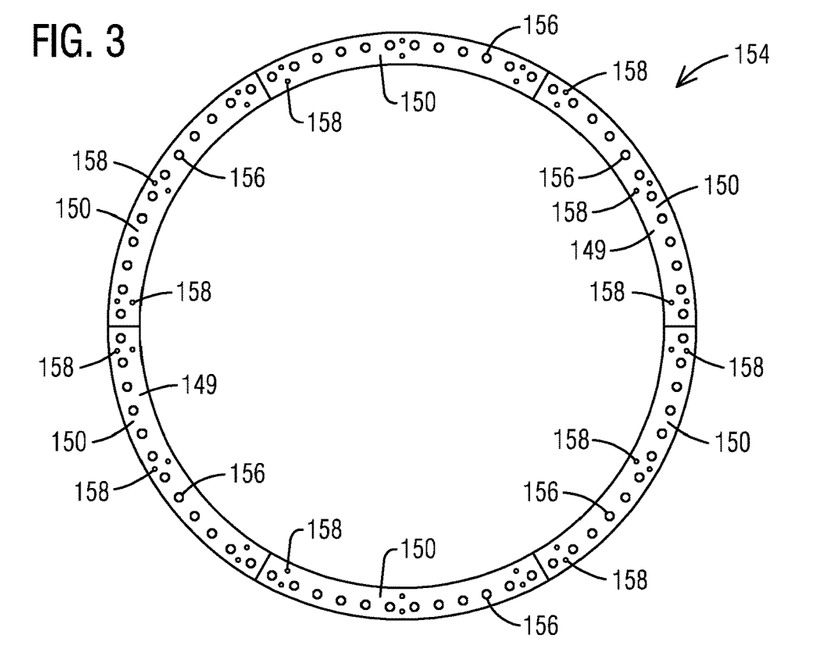
FIG. 3 is an exemplary segmented bearing plate formed from the plurality of segmented plates of FIG. 2.

FIG. 3 illustrates a plan view of a plurality of segmented plates 150 forming an annular segmented bearing plate 154 in accordance with aspects of the invention. In an exemplary embodiment, segmented bearing plate 154 may be formed from six (6) equally sized plates 150 each having the same constant radius of curvature. In FIG. 3, bearing plate 154 is formed as an annulus, but it will be appreciated that segmented bearing plates in other embodiments may have other geometric shapes. Each segmented plate 150 may have one or more apertures 156 formed therein to receive a corresponding anchor rod 152. In an exemplary embodiment, each plate 150 may have twelve equally spaced apertures 156 for alignment with and receipt of respective anchor rods 152 extending from topmost tower segment 132.

Figure 4:
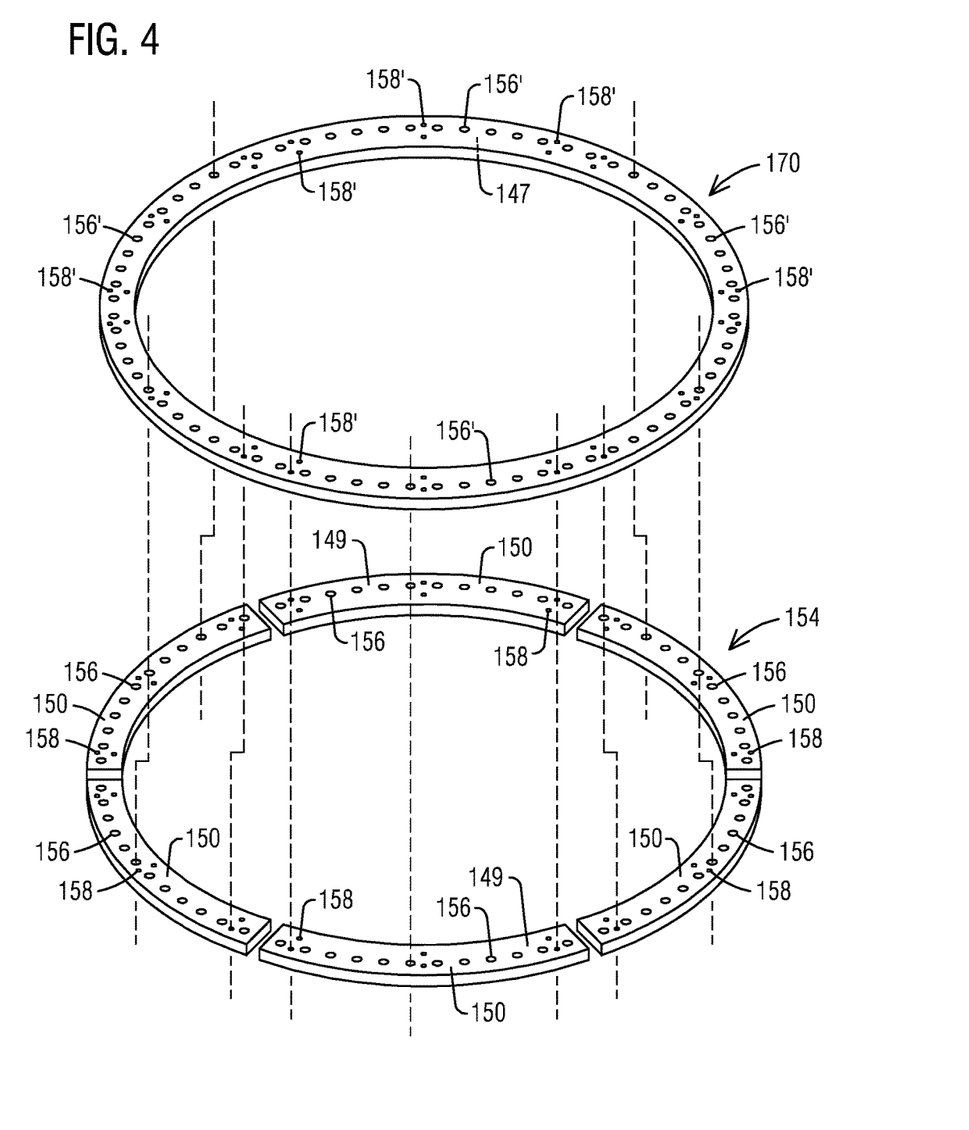
FIG. 4 is a perspective view of the segmented bearing plate of FIG. 3 and a mock-up flange or template ring to which the segmented bearing plate may be affixed in accordance with aspects of the invention.

Further apertures 158 may be formed within each plate 150 to be used for removably or releasably attaching the plates 150 to a mock-up flange or template ring 170, as shown in FIG. 4, to form the segmented bearing plate 154. Template ring 170 is intended to be a mock-up of the lower surface of flange 111 of steel tip adapter 110 that will be used to connect steel tip adapter 110 to topmost tower segment 132. In one embodiment, template ring 170 was, in fact, the lower flange 111 cut away from a spare tip adapter 110. Template ring 170 may be formed as a one piece ring having a pattern of apertures that match the pattern of apertures formed within the segmented plates 150 when the segmented plates 150 are attached to template ring 170. For example, template ring 170 may include a plurality of apertures 156' that align with the plurality of apertures 156 of the segmented bearing plate 154, and a plurality of aperture pairs 158' that align with the plurality of aperture pairs 158 of the segmented bearing plate 154. Because the plurality of apertures 156' will align with the plurality of apertures 156 when the segmented plates 150 are releasably attached to template ring 170. The plurality of apertures 156' will also align with and receive corresponding anchor rods 152 when placed there over.

FIG. 4 further shows that the plurality of aperture pairs 158 of a respective segmented plate 150 will align with respective ones of the plurality of aperture pairs 158' of template ring 170. This allows for conventional threaded bolts, for example, to be inserted through the holes and nuts threaded over the bolts to releasably secure the plurality of segmented plates 150 to the underside of template ring 170. In an exemplary embodiment, each plate segment 150 may have three (3) sets of aperture pairs 158 evenly spaced along the radius of the plate 150. Alternate means may be used to releasably secure segmented plates 150 and template ring 170 together, such as magnets, clamps, etc., provided that the plates 150 are tightly secured against template ring 170 during formation of the tower segment 132 in order to transfer the precision surface of the template ring 170 to the mate face of the segmented bearing plate 154 after the template ring 170 is removed once the tower segment 132 has been formed. Template ring 170 may be formed from flat stock steel or other structurally stable material (aluminum, plastic, fiberglass, etc) and has a mate face 147 (underside surface as illustrated in FIG. 4) formed to a desired flatness tolerance, such as plus or minus about 25 mils. The back side surface of ring 170 (top surface as illustrated in FIG. 4) may be formed to less of a flatness tolerance than the mate face surface 147 and may be left in its as-rolled condition without additional machining. Once removed from segmented plates 150, template ring 170 may be reused to form other segmented bearing plates 154 for other tower segments.

Alternate embodiments of the invention allow for segmented bearing plate 154 to be formed with varying numbers of segmented plates 150 of like or different shapes, each having the same or different quantities of apertures 156 and aperture pairs 158 formed therein depending on the diameter of topmost tower segment 132 or other tower specific parameters. The template 170 may be formed from more than one piece of material joined together, provided that the desired degree of flatness can be maintained in the mate face 147. Topographies other than a flat plane may be desired for the mate faces 147, 149 in other embodiments, such as a flat surface with a notch useful for carrying shear loads in the assembled tower 100.

Figures 5, 6:
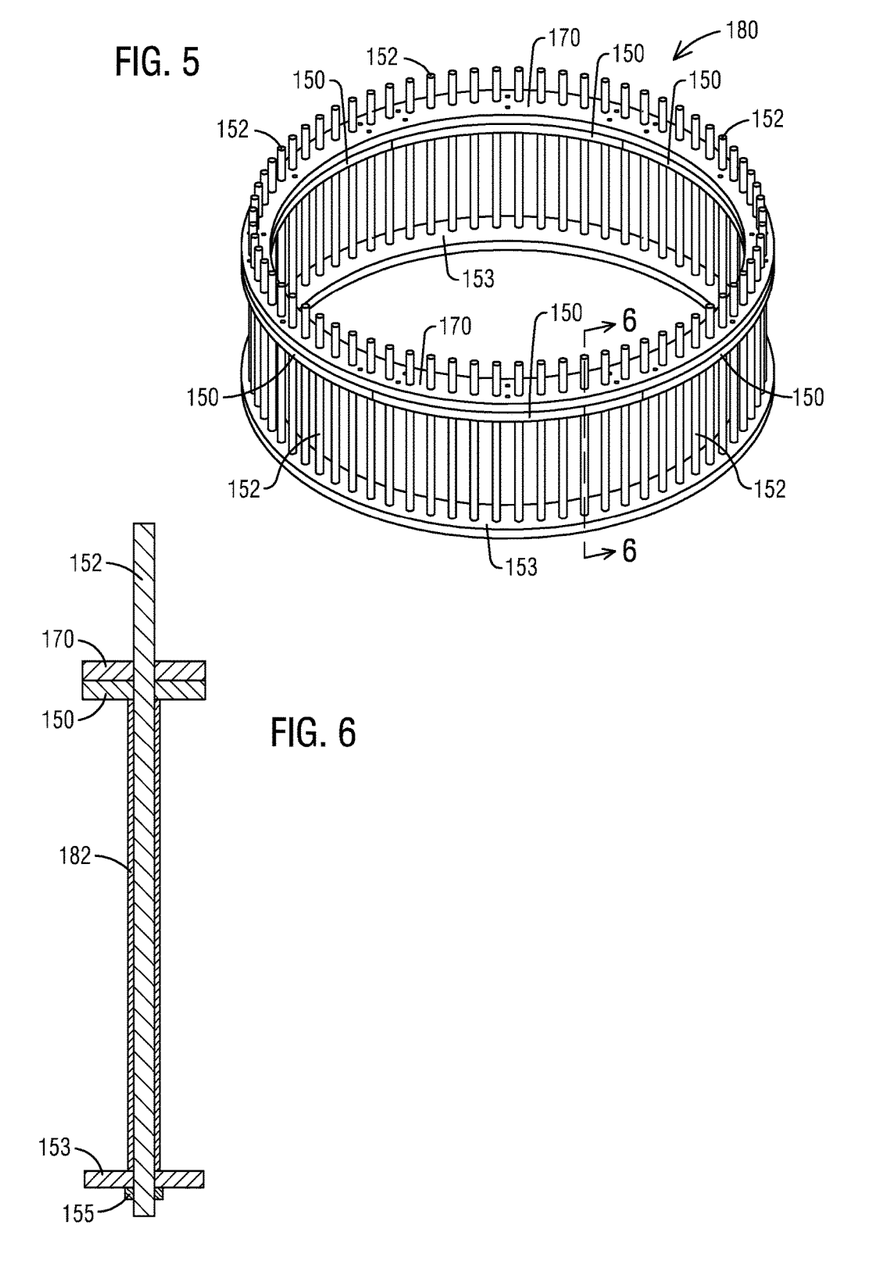
FIG. 5 is a perspective view of an exemplary anchor bar cage assembly including the mock-up flange or template ring and the segmented bearing plate of FIG. 4 connected therewith.
FIG. 6 is a cross section of an exemplary portion of the anchor bar cage assembly of FIG. 5.

FIG. 5 illustrates an anchor bar cage assembly 180 that may be used as part of a method for securing segmented bearing plate 154 within the topmost tower segment 132. Once embedded within topmost tower segment 132, segmented bearing plate 154 will be connected with flange 111 of steel tip adapter 110 to secure the steel tip adapter 110 in place on the top of the topmost tower segment 132. Anchor bar cage assembly 180 may be formed with an embedded plate 153 and a plurality of anchor bars 152 inserted through and extending from a corresponding plurality of apertures within embedded plate 153. Each anchor bar 152 may have a protective sleeve 182 inserted there over, as shown in FIG. 6. Plate segments 150 may be bolted or otherwise releasably connected with template ring 170 prior to placement over respective anchor bars 152. Alternatively, segmented plates 150 may be placed over anchor bars 152 first, then template ring 170 placed over anchor bars 152. This sequencing may depend on the size of segmented plates 150 and template ring 170 and/or the technique used to releasably secure segmented plates 150 and template ring 170 together.

FIG. 6 illustrates a cross section of an exemplary portion of anchor bar cage assembly 180. Anchor bar 152 is illustrated passing through embedded plate 153 and having nut 155 threaded on its lower end. A protective sleeve 182, such as a PVC sleeve, may be positioned over each anchor bar 152 to prevent them from becoming encased in concrete and so they may be tensioned when securing steel tip adapter 110 to topmost tower segment 132. For ease of illustration, protective sleeves 182 and nuts 155 are not shown for each anchor bar 152 in FIG. 5. With segmented plates 150 connected tightly to template ring 170, the combination may be placed over anchor bars 152 to rest on the upper ends of protective sleeves 182. The anchor bar cage assembly 180 may be placed or assembled within an appropriate form sized and shaped to receive concrete poured around the assembly 180 to form topmost tower segment 132.

In an exemplary embodiment of the invention, the plurality of segmented plates 150 may be cut from flat stock steel and machined flat on a mate face to any desired tolerance. Forming a segmented bearing plate 154 from a plurality of smaller plates 150 allows for cost effective cutting, machining and transporting of the segments versus a one piece bearing plate having a mate face of the same tolerance. Further, since the mate face (upper) surfaces 149 of segmented plates 150 will be pulled tight to the mate face (lower) surface 147 of template ring 170, any thickness differences among segmented plates 150 are accounted for in the subsequently poured concrete and grout layer 151 formed beneath the segmented plates 150 during forming of the segment 132. In other words, with segmented plates 150 pulled tight to template ring 170, the lower surface of segmented plates 150 does not need to be machined to a tight tolerance. This is because after concrete is poured to form grout trough 157, grout layer 151 can be injected within the trough until it sufficiently contacts the lower surface of each segmented plate 150, regardless of each segment's thickness or whether the lower surface has undulations, voids or other abnormalities. The flatness (or other desired topography) of template mate face 147 is imposed against the bearing plate mate face 149; i.e. the smaller plates 150 are all held with their mate faces 149 flat and parallel against the template mate face 147. The upper surfaces of plates 150 collectively form the mate face surface 149 of bearing plate 154 for abutment against flange 111 when the segment 132 is installed in the tower 100. This reduces the necessity of machining each plate 150 to a tight thickness tolerance, and only one side 149 of a plate 150 need be flat to a tolerance, thereby reducing cutting and machining costs.

It has further been determined by the present inventor that pouring certain concrete compositions until they contact the bottom surface of plates 150 may cause air bubbles to collect against the bottom surface of the plates 150, thereby potentially weakening the strength of the bond between the concrete and plates 150. To avoid this situation, with plates 150 and template 170 releasably connected together and placed over anchor bars 152, concrete may be poured within the form used to form topmost tower segment 132 to a height that is below segmented plates 150, thereby defining grout trough 157 (FIG. 2). In an exemplary embodiment of the invention, concrete may be poured to a height that is about 2 inches below plates 150. Once the concrete has sufficiently set, grout may be injected into the trough 157 to form grout layer 151 that sufficiently contacts the lower surface of segmented plates 150 to secure the segmented plates 150 within the trough. The depth of grout trough 157 may vary as a function of specific tower and material design parameters. Once grout layer 151 has set, template ring 170 may be removed to expose the mate face or upper surface of segmented bearing plate 154. In alternate embodiments, concrete may be poured until it contacts segmented plates 150 provided that an appropriate concrete composition is used to ensure a sufficiently strong bond between segmented plates 150 and the concrete.

Figure 7:
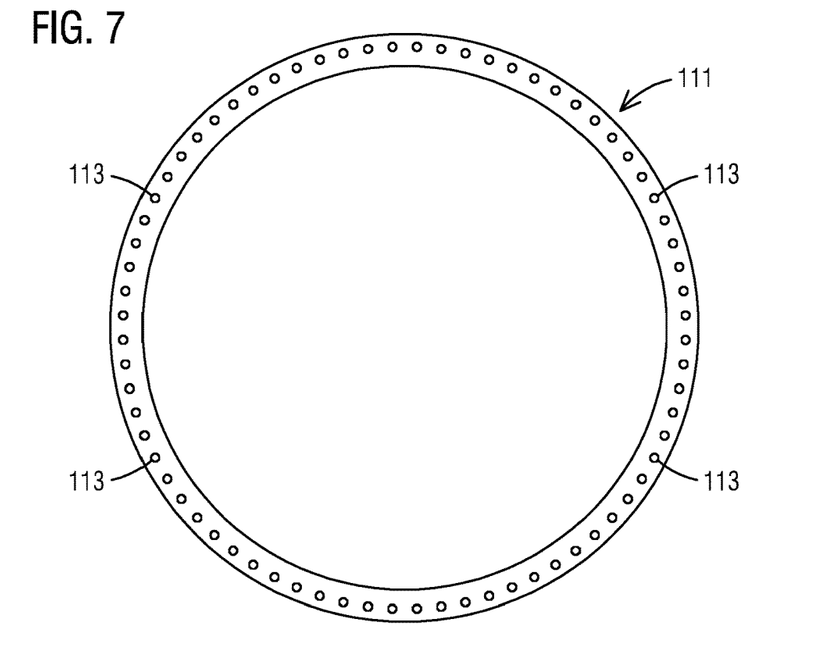
FIG. 7 is a bottom view of the flange of the steel tip adapter of FIG. 1.

FIG. 7 is a bottom view of flange 111 of steel tip adapter 110 illustrating the plurality of apertures 113 that will align with the plurality of apertures 156 formed within segmented bearing plate 154 when steel tip adapter 110 is connected with topmost tower segment 132. Steel tip adapter 110 may be connected with topmost tower segment 132 by inserting the upper end of respective anchor bars 152 through the plurality of apertures 113 in flange 110 so that the lower surface of flange 110 rests upon the mateface or upper surface formed by segmented bearing plate 154. The upper ends of anchor bars 152 may be threaded so that conventional nuts may be threaded thereon and tightened to a specified load or torque to secure steel tip cap 110 with topmost tower segment 132. It will be appreciated that the thickness and width of flange 111 may be sized as a function of specific tower design parameters. Because segmented bearing plate 154 is formed from a plurality of individual smaller plates 150, the individual plates 150 serve as load distributors from the steel tip adapter 110 into the concrete body portion of topmost tower segment 132.

While various embodiments of the present invention have been shown and described herein, it will be obvious that such embodiments are provided by way of example only. Numerous variations, changes and substitutions may be made without departing from the invention herein. For example, exemplary embodiments of the present invention are described with respect to the connection of topmost tower segment 132 with steel tip adapter 110; however, alternate embodiments of the invention may be adapted to connect any two or more tower segments together. Accordingly, it is intended that the invention be limited only by the spirit and scope of the appended claims.

The invention claimed is:

1. A method of forming a segment of a concrete tower, the method comprising:
    forming a template comprising a template mate face having a desired topography;
    disposing a plurality of smaller plates against the template mate face such that the topography of the template mate face positions the smaller plates to define a bearing plate mate face;
    pouring concrete in a desired shape of the segment to secure the smaller plates together; and
    removing the template from against the smaller plates to reveal the bearing plate mate face.

2. The method of claim 1, further comprising reusing the template to form a further segment.

3. The method of claim 1, further comprising:
    providing an anchor bar cage assembly comprising an embedded plate and a plurality of anchor bars extending through respective ones of the plurality of smaller plates; and
    pouring the concrete to encase the anchor bar cage assembly in the desired shape of the segment.

4. The method of claim 3, further comprising installing a protective sleeve over each anchor bar between the embedded plate and the respective smaller plate to restrict contact between the concrete and the anchor bars.

5. The method of claim 3, further comprising:
    pouring the concrete to a level short of making contact with the smaller plates to define a grout trough; and
    filling the grout trough with grout to secure the smaller plates together.

6. The method of claim 1, further comprising machining only one side of each smaller plate to a desired flatness tolerance.

7. The method of claim 1 used to form a topmost segment of a wind turbine tower, the method further comprising using a flange of a steel tip adapter as the template.

8. The method of claim 7, further comprising reusing the flange as the template for forming topmost segments of multiple wind turbine towers.

* * * * *